US011568272B2

(12) United States Patent
Puget et al.

(10) Patent No.: US 11,568,272 B2
(45) Date of Patent: Jan. 31, 2023

(54) GENERATING NATIVE CODE WITH DYNAMIC REOPTIMIZATION FOR ENSEMBLE TREE MODEL PREDICTION

(71) Applicant: INTERNATIONAL BUSINESS MACHINES CORPORATION, Armonk, NY (US)

(72) Inventors: Jean-François Puget, Saint Raphael (FR); Ke Wei Wei, Beijing (CN); Xinke Wang, Beijing (CN); Qi Wen, Beijing (CN); Chu Yun Tong, Beijing (CN); Tian Tian, Beijing (CN); Chi Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 16/896,460

(22) Filed: Jun. 9, 2020

(65) Prior Publication Data
US 2021/0383244 A1 Dec. 9, 2021

(51) Int. Cl.
*G06N 20/20* (2019.01)
*G06F 9/30* (2018.01)
*G06F 9/45* (2006.01)
*G06N 5/00* (2006.01)
*G06F 8/41* (2018.01)
*G06K 9/62* (2022.01)

(52) U.S. Cl.
CPC ............... *G06N 5/003* (2013.01); *G06F 8/41* (2013.01); *G06K 9/623* (2013.01); *G06K 9/6262* (2013.01); *G06N 20/20* (2019.01)

(58) Field of Classification Search
CPC .......... G06N 5/003; G06N 20/20; G06F 9/30; G06F 9/45
USPC ......................................................... 706/45
See application file for complete search history.

(56) References Cited

U.S. PATENT DOCUMENTS

| 7,840,951 B1* | 11/2010 | Wright ................ G06F 9/45516 717/148 |
| 9,678,730 B2 | 6/2017 | Dunn et al. |
| 9,710,751 B2 | 7/2017 | Cichosz et al. |
| 2013/0073883 A1* | 3/2013 | Vick ..................... G06F 1/3212 713/320 |
| 2013/0283249 A1* | 10/2013 | Kanhere ............. G06F 9/30109 717/139 |
| 2015/0277872 A1* | 10/2015 | Gschwind ........... G06F 9/45516 717/153 |

(Continued)

OTHER PUBLICATIONS

Misic et al., Optimization of Tree Ensembles, Anderson School of Management, University of California, 2017, 48 pages.

(Continued)

*Primary Examiner* — Nga B Nguyen
(74) *Attorney, Agent, or Firm* — Cantor Colburn LLP; Teddi Maranzano

(57) ABSTRACT

Aspects of the invention include a computer-implemented method that receives, by a processor, an ensemble decision tree and generates, by the processor, native code from the ensemble decision tree. The method compiles, by the processor, the native code into machine language and scores, by the processor, the execution time of the native code. The method dynamically reoptimizes, by the processor, portions of the native code corresponding to the most traversed portion of the ensemble decision tree.

20 Claims, 5 Drawing Sheets

(56) References Cited

U.S. PATENT DOCUMENTS

2018/0336487 A1    11/2018  Moore et al.

OTHER PUBLICATIONS

Weinberg et al., "Selecting a representative decision tree from an ensemble of decision-tree models for fast big data classification," J Big Data, 2019, 17 pages.

* cited by examiner

GENERATING NATIVE CODE WITH DYNAMIC REOPTIMIZATION FOR ENSEMBLE TREE MODEL PREDICTION

BACKGROUND

The present invention generally relates to decision trees, and more specifically, to generating native code with dynamic reoptimization for ensemble tree model prediction.

Decision models are getting ever more complicated. One example decision model is a decision tree, which is a simple algorithm for regression or other type of prediction. Decision trees may also be combined as ensemble models. There may be thousands of such decision trees. When decision trees are aggregated, the process is similar to taking an average or mean value. The accuracy of the result is generally better with ensemble models than just a single decision tree.

SUMMARY

Embodiments of the present invention are directed to generating native code with dynamic reoptimization for ensemble tree model prediction. A non-limiting example computer-implemented method includes receiving, by a processor, an ensemble decision tree and generating, by the processor, native code from the ensemble decision tree. The method compiles, by the processor, the native code into machine language and scores, by the processor, the execution time of the native code. The method dynamically reoptimizes, by the processor, portions of the native code corresponding to the most traversed portion of the ensemble decision tree.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
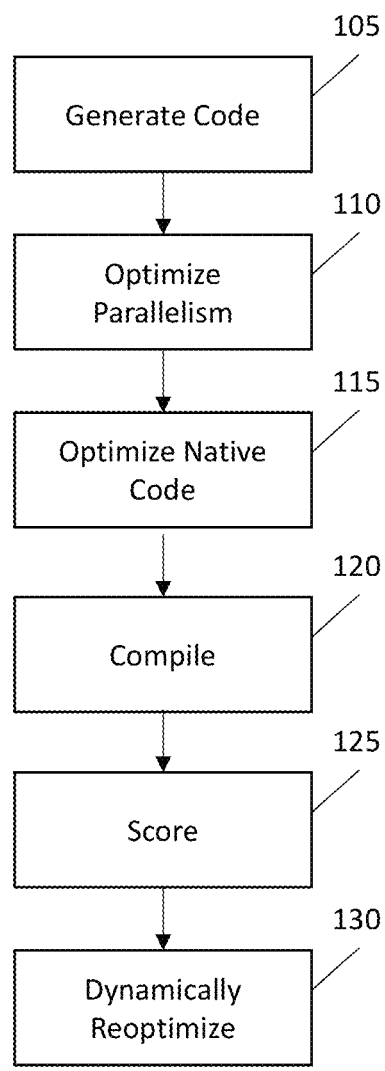
FIG. 1 illustrates a flow diagram of a process for generating native code for ensemble tree model prediction in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a hybrid approach to compiling a decision tree into native code for faster execution. In contrast to approaches that compile every branch of the decision tree, embodiments of the present invention use dynamic reoptimization to recompile code based on the frequency with which each branch of the decision tree is being executed. This allows for faster and more efficient compilation of a decision tree into native code than in current practice. Decision trees require scoring to determine results. Ensemble decision trees combine several decision trees to produce better predictive performance than utilizing a single decision tree. The main principle behind the ensemble model is that a group of weak learners come together to form a strong learner. The ensemble approach creates challenges for scoring. Normal trees can be traversed from root to leaf node, but in ensemble trees hundreds of thousands of traverses are typically required in order to predict one model. It can take tens of milliseconds to perform these traverses, which is too slow for most users.

One approach to speeding up the prediction time is to convert decision trees into native code such as Java®, C, or Python®. A compiler that compiles the code can be more efficient. Compilation helps on the performance side by improving the speed of traversing the tree. However, there is still a downside in generating code.

One or more embodiments of the present invention tend to improve ensemble tree model prediction by generating native code with dynamic reoptimization by managing the size of the generated code from the compilation to get the benefit of compiled code performance without creating too many lines of code. Embodiments of the present invention use a hybrid approach. Embodiments determine which part of the model to compile and what percentage of the model to compile. The disclosed method receives an ensemble tree model and then uses a code generator that generates code for branches of the decision tree into native code. A parallelism optimizer decodes the tree to determine which parts of the code can be performed in parallel. A native code optimizer can also be used to optimize the code. Unlike contemporary methodologies that blindly compile all parts of the tree, upon scoring the tree embodiments of the present invention use dynamic reoptimization. Dynamic reoptimization recompiles code based on the frequency with which each branch is executed.

Figure 2:
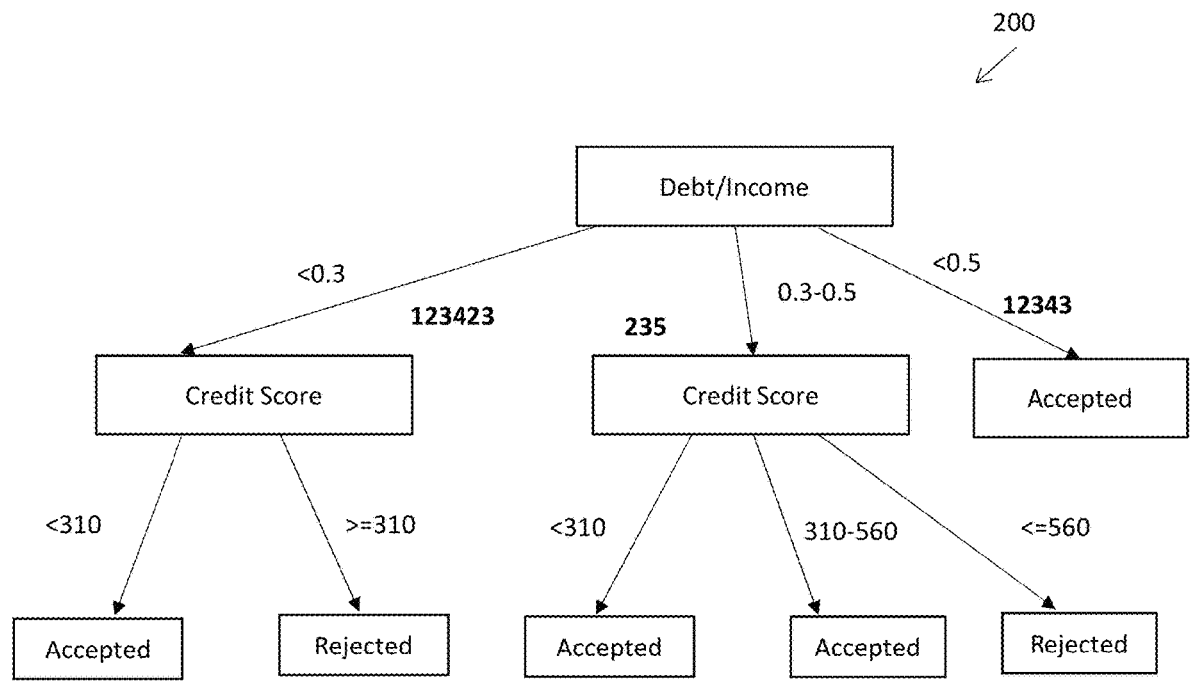
FIG. 2 illustrates an example ensemble tree for traversal that may be analyzed in accordance with one or more embodiments of the present invention.

Turning now to FIG. 1, illustrated is a flow diagram of a process for generating native code for ensemble tree model prediction in accordance with one or more embodiments of the present invention. An ensemble tree model, such as the one shown below in FIG. 2, is received and code generated at block 105. Each decision tree can be converted into a code block consisting of a set of if/then/else statements. A code generator converts the ensemble tree model to native code for each branch of the decision tree. If the native code is determined to be large to manage, select tree branches are managed individually. The branches with higher probability to be reached will be converted while other branches will remain to be executed by traveling and interpreting at execution time. The probability information can be found from the training data initially.

As an ensemble tree model can have many decision trees which are independent of each other, evaluating trees in parallel can reduce the overall elapsed time of the evaluation of the ensemble model. At block 110, a parallelism optimizer determines if parallel execution should be enabled and the optimal parallel degree given existing resources. Native code is optimized at block 115. Various technologies can be used to optimize the generated native code. For example, the code block which is the most likely chosen should be placed at earlier position. (IF A<=5 THEN . . . ELSEIF A>5 AND A<=10 THEN . . . , if there is only 5% chance A<5 while 15% chance A BETWEEN 5 AND 10, 5 AND 10 should be placed before A<5). As another example, enabling SIMD (single instruction multiple data) in code whenever possible is desirable. A compiler compiles the native code into machine language at block 120. At block 125, the resulting executable code is scored where execution time of the various branches is monitored following deployment. The frequencies of each branches being visited are saved to a repository. Then periodically the information will be used to re-determine which branches should be converted and which should still be interpreted at runtime respectively.

Following scoring and deployment, dynamic reoptimization of the executable code is performed at block 130. During dynamic reoptimization, the portion of the native code (corresponding to a portion of the tree) that is executed most frequently is optimized. Typically, optimizing to a depth of eight to ten levels in the tree may yield the best results. As the tree is traversed, the method tracks the number of executions of each subtree, in other words, each path.

The performance improvement of each recompiled portion of the subtree is measured following a redeployment of the recompiled portion of the subtree. Following that the frequency of execution of each subtree is monitored, as the frequency could change over time. Empirically, the model receives enough information over time to create a new model to make predictions as to what is the most optimal way of compiling the tree. For example, the performance improvement and frequency is monitored over time to determine the portions of the tree to continue to optimize.

FIG. 2 illustrates an example ensemble tree 200 for traversal that may be analyzed in accordance with one or more embodiments of the present invention. This exemplary ensemble decision tree 200 is for determining whether to give credit to an individual applying for credit. In this tree, the debt to income ratio for the individual is determined. Based on the ratio, the tree 200 may accept the application (when the debt/income ratio is greater than 0.5, or the tree 200 may examine the individual credit score. Depending upon the credit score and the debt/income ratio, a decision will be made. Following compilation of the tree 200 into machine language and execution through the decision, the number of executions of each branch of the tree is monitored for dynamic reoptimization purposes. In this example, the number of traverses is indicated in bold numbers. The left side of the tree is executed 123,423 times, the middle of the tree is executed 235 times, and the right side of the tree is executed 12,343 times. Therefore, dynamic reoptimization would focus on the left side of the decision tree and that branch would be the subject of reoptimization.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
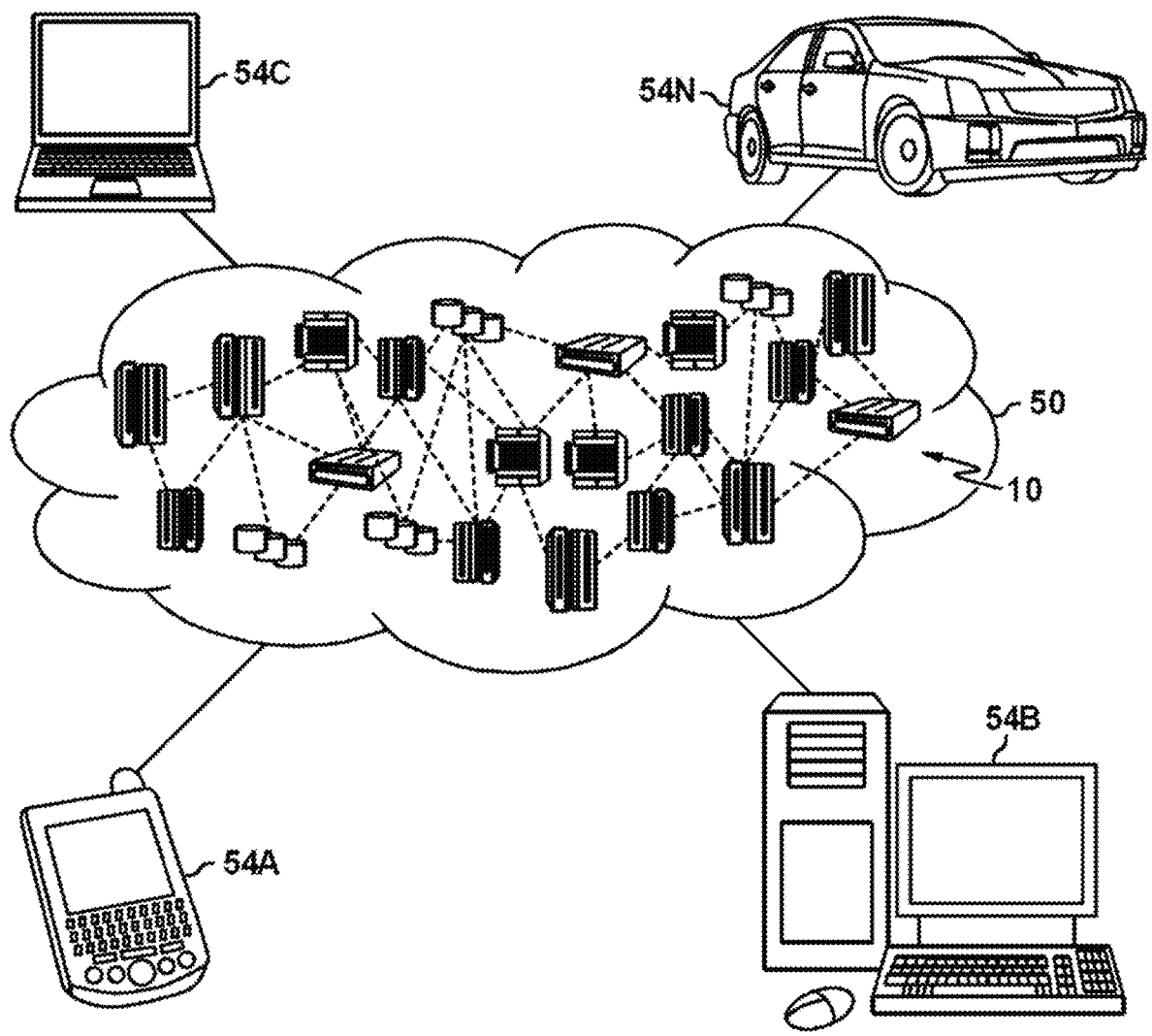
FIG. 3 depicts a cloud computing environment according to one or more embodiments of the present invention.
Figure 5:
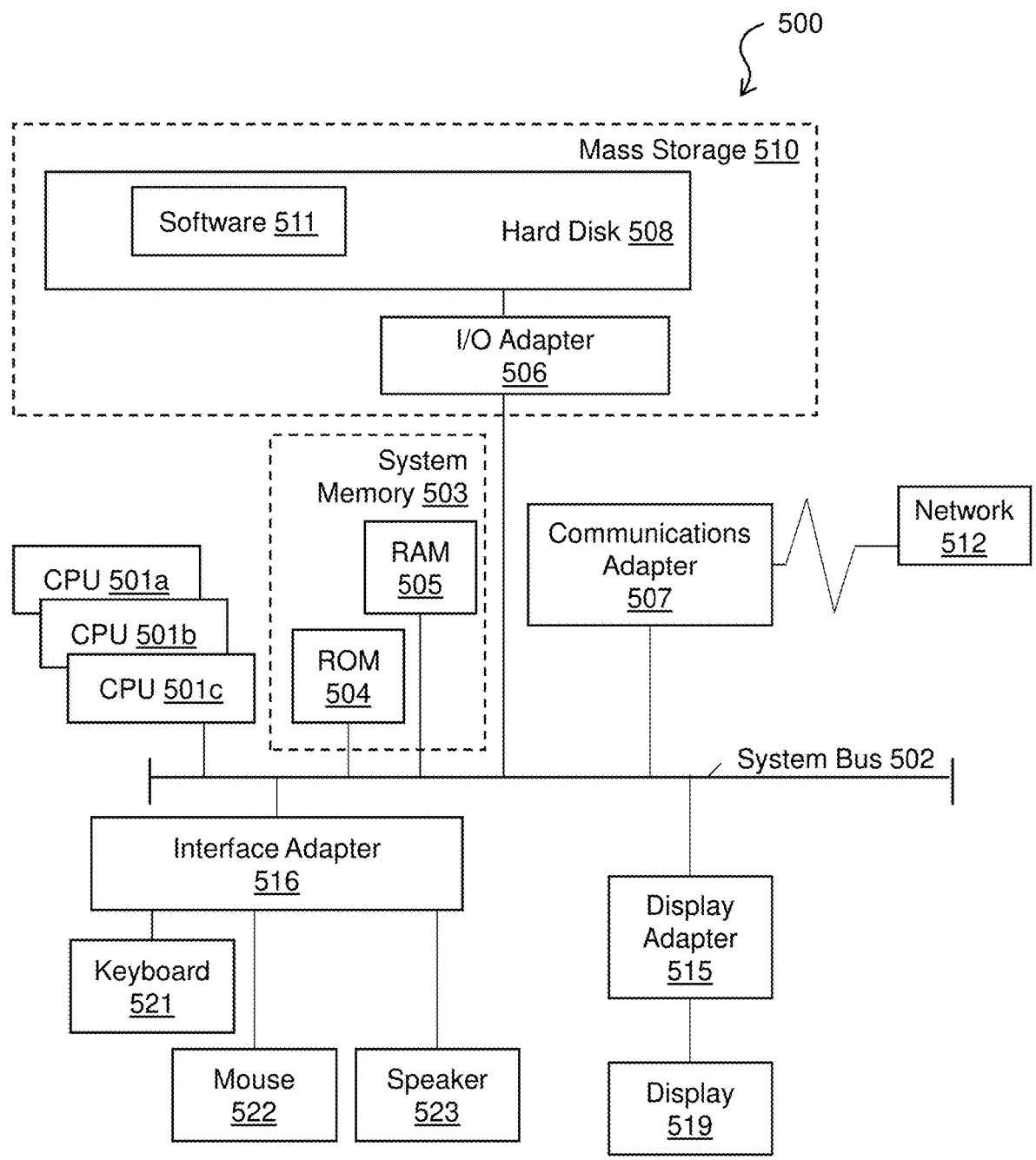
FIG. 5 depicts a computer system in accordance with one or more embodiments of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 4:
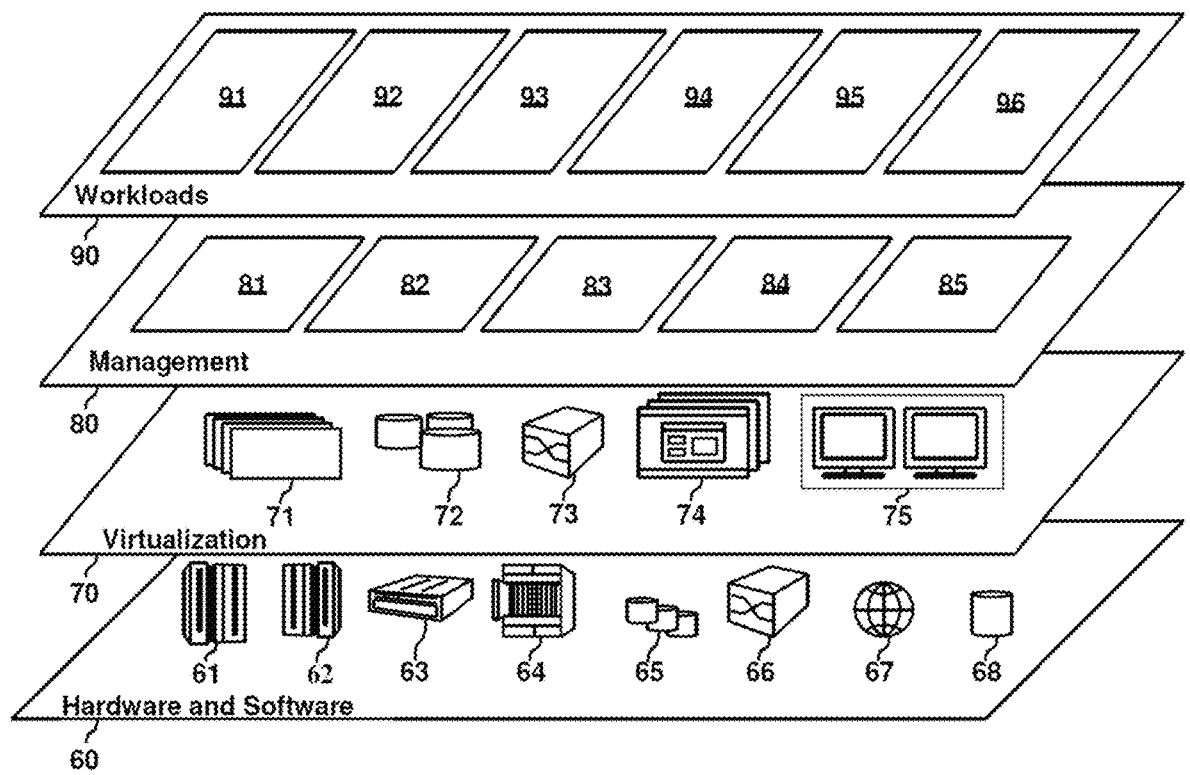
FIG. 4 depicts abstraction model layers according to one or more embodiments of the present invention.

Referring now to FIG. 4, a set of functional abstraction layers provided by cloud computing environment 50 (FIG. 3) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Secure service container-based virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and competency assessment processing 96

Turning now to FIG. 5, a computer system 500 is generally shown in accordance with an embodiment. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM)

504 and a random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein below with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, such as the z/OS or AIX operating system from IBM Corporation, to coordinate the functions of the various components shown in FIG. 5.

Additional input/output devices are shown as connected to the system bus 502 via a display adapter 519 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A keyboard 521, a mouse 522, a speaker 523, etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and, storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the Internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processor, an ensemble decision tree;
   generating, by the processor, native code from the ensemble decision tree;
   compiling, by the processor, the native code into machine language;
   scoring, by the processor, the execution time of the native code;
   dynamically reoptimizing, by the processor, portions of the native code corresponding to the most traversed portion of the ensemble decision tree, the portions comprising a proper subset of the native code; and
   executing, by the processor, the native code.

2. The computer-implemented method of claim 1, further comprising optimizing, by the processor, parallelism of the native code.

3. The computer-implemented method of claim 1, further comprising, optimizing, by the processor, the native code.

4. The computer-implemented method of claim 1, wherein dynamically reoptimizing comprises dynamically reoptimizing to a tree depth of eight levels.

5. The computer-implemented method of claim 1, wherein dynamically reoptimizing comprises measuring performance improvement of the most traversed portion of the native code over time.

6. The computer-implemented method of claim 5, wherein based on the performance improvement increasing over time additional reoptimization of the native code is performed.

7. The computer-implemented method of claim 5, wherein based on the performance improvement not increasing over time additional reoptimization of the native code is not performed.

8. A system comprising:
   a memory having computer readable instructions; and
   one or more processors for executing the computer readable instructions, the computer readable instructions controlling the one or more processors to perform operations comprising:
   receiving an ensemble decision tree;
   generating native code from the ensemble decision tree;
   compiling the native code into machine language;
   scoring the execution time of the native code; and
   dynamically reoptimizing portions of the native code corresponding to the most traversed portion of the ensemble decision tree, the portions comprising a proper subset of the native code; and
   executing, by the processor, the native code.

9. The system of claim 8, further comprising optimizing parallelism of the native code.

10. The system of claim 8, further comprising, optimizing the native code.

11. The system of claim 8, wherein dynamically reoptimizing comprises dynamically reoptimizing to a tree depth of eight levels.

12. The system of claim 8, wherein dynamically reoptimizing comprises measuring performance improvement of the most traversed portion of the native code over time.

13. The system of claim 12, wherein based on the performance improvement increasing over time additional reoptimization of the native code is performed.

14. The system of claim 12, wherein based on the performance improvement not increasing over time additional reoptimization of the native code is not performed.

15. A computer program product comprising one or more computer readable storage media having program instructions embodied therewith, the program instructions executable by a processor to cause the processor to perform operations comprising:

receiving an ensemble decision tree;
generating native code from the ensemble decision tree;
compiling the native code into machine language;
scoring the execution time of the native code; and
dynamically reoptimizing portions of the native code corresponding to the most traversed portion of the ensemble decision tree, the portions comprising a proper subset of the native code; and
executing, by the processor, the native code.

16. The computer program product of claim 15, further comprising optimizing parallelism of the native code.

17. The computer program product of claim 15, wherein dynamically reoptimizing comprises dynamically reoptimizing to a tree depth of eight levels.

18. The computer program product of claim 15, wherein dynamically reoptimizing comprises measuring performance improvement of the most traversed portion of the native code over time.

19. The computer program product of claim 18, wherein based on the performance improvement increasing over time additional reoptimization of the native code is performed.

20. The computer program product of claim 18, wherein based on the performance improvement not increasing over time additional reoptimization of the native code is not performed.

* * * * *